US012574886B2

(12) United States Patent 
Kaushik et al.

(10) Patent No.: US 12,574,886 B2 
(45) Date of Patent: Mar. 10, 2026

(54) OPTIMIZED REGISTRATION AND DEREGISTRATION MESSAGING WITH THE SMSF AND UDM

(71) Applicant: T-Mobile USA, Inc., Bellevue, WA (US)

(72) Inventors: Subramania Kaushik, Bellevue, WA (US); Anil Kumar Mariyani, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 321 days.

(21) Appl. No.: 18/455,990

(22) Filed: Aug. 25, 2023

(65) Prior Publication Data

US 2025/0071714 A1 Feb. 27, 2025

(51) Int. Cl. 
*H04W 60/06* (2009.01) 
*H04W 4/14* (2009.01) 
(Continued)

(52) U.S. Cl. 
CPC ............. *H04W 60/06* (2013.01); *H04W 4/14* (2013.01); *H04W 8/02* (2013.01); 
(Continued)

(58) Field of Classification Search 
CPC ........... H04W 4/14; H04W 8/18; H04W 8/20; H04W 88/18; H04W 60/04; H04W 4/50; 
(Continued)

(56) References Cited

U.S. PATENT DOCUMENTS 10,932,097 B2 * 2/2021 Hua ..................... H04L 65/1073 
11,689,915 B1 * 6/2023 Mariyani .............. H04W 24/04 
455/422.1 
(Continued)

FOREIGN PATENT DOCUMENTS

CN 112087770 A * 12/2020 ............ H04W 24/04 
CN 114584936 A 6/2022 
(Continued)

OTHER PUBLICATIONS

ETSI TS 123 502 V16.16.0 (Jul. 2023), "5G Procedures for the 5G System (5GS) (3GPP TS 23.502 version 16.16.0 Release 16)" ( Year: 2023).*

(Continued)

*Primary Examiner* — Dung Hong 
(74) *Attorney, Agent, or Firm* — Lee & Hayes, P.C.

(57) ABSTRACT 
Techniques for optimizing messages in a telecommunications network are discussed herein. More particularly, an SMSF can be configured to refrain from sending deregistration and/or unsubscribe messages to a UDM in response to a handover from 5G to 4G, which can thereby reduce signaling in the network. Further, because of the suppressed messages, the network maintains SMSF session information, which indicates the delivery location for a SMS message. However, when a SMSC receives a SMS addressed to the UE, the HSS may query a UDR for SMSF session information, SMSF registration status, and/or AMF registration status. The HSS may determine a location for the SMS based on the active location of the UE, as determined by the AMF registration status. Thus, the techniques discussed herein represent network optimizations while allowing SMS messages to be correctly routed in a network.

20 Claims, 6 Drawing Sheets

500

RECEIVE, BY A SMSF, A REGISTRATION REQUEST FROM AN AMF ASSOCIATED WITH A UE ATTACHING TO A 5G BASE STATION 
502

SET, BY THE SMSF AND IN RESPONSE TO THE REGISTRATION REQUEST, 5G REGISTRATION STATUS TO ACTIVE AND A 5G PURGE FLAG TO FALSE 
504

RECEIVE, BY THE SMSF AND FROM THE AMF, A HANDOVER NOTIFICATION INDICATING A HANDOVER OF THE UE FROM 5G TO 4G 
506

SET, BY THE SMSF AND IN RESPONSE TO THE HANDOVER NOTIFICATION, THE 5G REGISTRATION STATUS TO NOT ACTIVE AND MAINTAIN THE 5G PURGE FLAG SET TO FALSE 
508

BASED ON THE 5G REGISTRATION STATUS AND THE 5G PURGE FLAG, REFRAIN, BY THE SMSF, FROM SENDING A DEREGISTRATION NOTIFICATION TO A UDM 
510

(51) Int. Cl.

| | |
|---|---|
| *H04W 8/02* | (2009.01) |
| *H04W 36/00* | (2009.01) |
| *H04W 36/14* | (2009.01) |
| *H04W 60/04* | (2009.01) |

(52) U.S. Cl.
    CPC ....... *H04W 36/0061* (2013.01); *H04W 36/14*
                   (2013.01); *H04W 60/04* (2013.01)

(58) Field of Classification Search
    CPC ......... H04W 60/06; H04W 8/26; H04W 8/02;
                   H04W 36/0061; H04W 36/14
    See application file for complete search history.

(56) References Cited

U.S. PATENT DOCUMENTS

| | | | |
|---|---|---|---|
| 12,206,742 | B1 | 1/2025 | Sangameswaran et al. |
| 2018/0324585 | A1 | 11/2018 | Nair et al. |
| 2019/0052661 | A1 | 2/2019 | Anand |
| 2019/0387369 | A1* | 12/2019 | Kaura ..................... H04W 4/14 |
| 2020/0112907 | A1 | 4/2020 | Dao et al. |
| 2021/0168571 | A1* | 6/2021 | Tang ..................... H04W 60/04 |
| 2021/0368345 | A1 | 11/2021 | Nakarmi et al. |
| 2022/0078592 | A1* | 3/2022 | Qu .......................... H04L 67/55 |
| 2022/0141661 | A1 | 5/2022 | Kievit et al. |
| 2022/0225214 | A1 | 7/2022 | Vamanan et al. |
| 2022/0346052 | A1* | 10/2022 | Foti ....................... H04W 60/04 |
| 2022/0360954 | A1* | 11/2022 | Castellanos Zamora .................... H04W 60/00 |
| 2023/0075951 | A1* | 3/2023 | Long ....................... H04L 69/40 |

| | | | |
|---|---|---|---|
| 2023/0247394 | A1* | 8/2023 | Lu ........................... H04W 4/14 455/466 |
| 2024/0031804 | A1 | 1/2024 | Nicoara et al. |
| 2024/0080922 | A1* | 3/2024 | Jeong .................... H04W 76/15 |
| 2025/0071524 | A1 | 2/2025 | Kaushik |

FOREIGN PATENT DOCUMENTS

| | | | | |
|---|---|---|---|---|
| CN | 115088278 | A * | 9/2022 | .............. H04W 4/14 |
| CN | 115334463 | A * | 11/2022 | .............. H04W 4/14 |
| KR | 102253961 | B1 | 5/2021 | |
| WO | WO-2019201038 | A1 * | 10/2019 | ......... H04W 68/005 |
| WO | WO2021201558 | A1 | 10/2021 | |
| WO | WO-2022151367 | A1 * | 7/2022 | ............ H04W 24/04 |

OTHER PUBLICATIONS

3GPP, "Procedures for the 5G System (5GS); Stage 2 (Release 18)", 3GPP TS 23.502, vol. 18.2.0, Jun. 29, 2023, pp. 1-531.

3GPP; TSG CT; "5G System; Unified Data Management Services; Stage 3 (Release 18)", 3GPP TS 29.503 V18.2.0, Jun. 26, 2023.

3GPP; TSG CT, "User data interworking, coexistence and migration; Stage 2; (Release 18)", 3GPP TS 23.632 V18.2.0, Jun. 23, 2023.

Search Report and Written Opinion for International Application No. PCT/US24/43049, Dated Dec. 11, 2024, 8 pages.

Search Report and Written Opinion for International Application No. PCT/US24/42961, Dated Dec. 2, 2024, 8 pages.

Office Action for U.S. Appl. No. 18/455,974, Dated Nov. 4, 2025, 19 Pages.

* cited by examiner

FIG. 1

500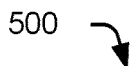

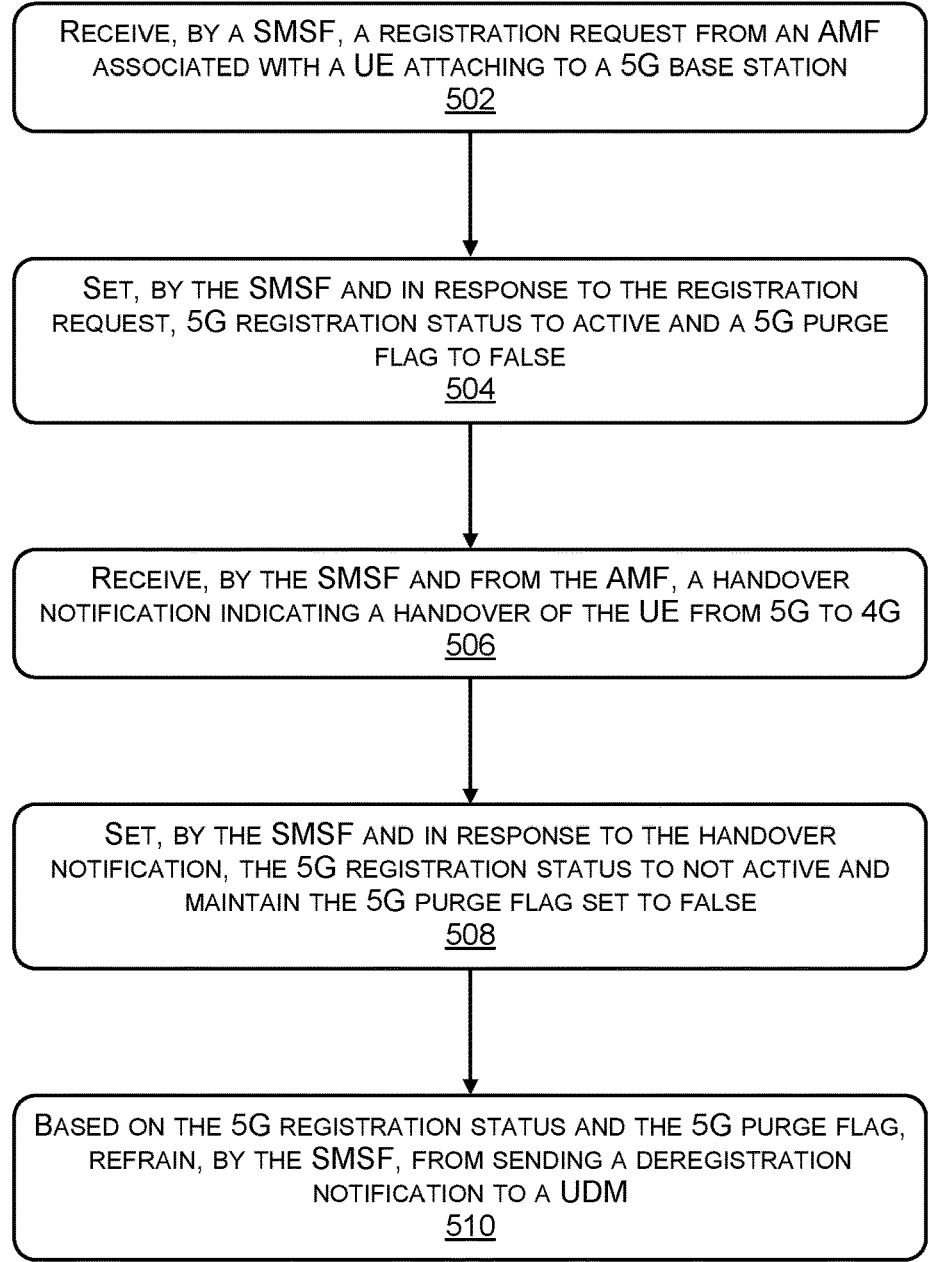

RECEIVE, BY A SMSF, A REGISTRATION REQUEST FROM AN AMF ASSOCIATED WITH A UE ATTACHING TO A 5G BASE STATION
502

SET, BY THE SMSF AND IN RESPONSE TO THE REGISTRATION REQUEST, 5G REGISTRATION STATUS TO ACTIVE AND A 5G PURGE FLAG TO FALSE
504

RECEIVE, BY THE SMSF AND FROM THE AMF, A HANDOVER NOTIFICATION INDICATING A HANDOVER OF THE UE FROM 5G TO 4G
506

SET, BY THE SMSF AND IN RESPONSE TO THE HANDOVER NOTIFICATION, THE 5G REGISTRATION STATUS TO NOT ACTIVE AND MAINTAIN THE 5G PURGE FLAG SET TO FALSE
508

BASED ON THE 5G REGISTRATION STATUS AND THE 5G PURGE FLAG, REFRAIN, BY THE SMSF, FROM SENDING A DEREGISTRATION NOTIFICATION TO A UDM
510

FIG. 5

600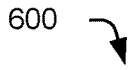

RECEIVE, BY A HSS, A QUERY FROM A SMSC TO SEND A SMS TO A UE
602

SEND, BY THE HSS AND TO A UDM, A REQUEST FOR UE NETWORK STATUS INFORMATION
604

RECEIVE, BY THE HSS AND FROM THE UDR, SMSF REGISTRATION STATUS DATA AND AMF REGISTRATION STATUS DATA
606

DETERMINE, BASED ON THE SMSF REGISTRATION STATUS DATA AND THE AMF REGISTRATION STATUS DATA, WHETHER THE UE IS ACTIVE IN A 4G OR A 5G RADIO NETWORK
608

4G                                                     5G

SEND, TO THE SMSC, FIRST LOCATION DATA ASSOCIATED WITH AN MME
610

SEND, TO THE SMSC, SECOND LOCATION DATA ASSOCIATED WITH THE SMSF
612

FIG. 6

OPTIMIZED REGISTRATION AND DEREGISTRATION MESSAGING WITH THE SMSF AND UDM

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

The increased availability and performance characteristics of fifth generation (5G) networks have greatly enhanced the communication experiences of users. In some environments, however, the relative capabilities of 4G networks and 5G networks may result in handovers from 5G to 4G and, as environment, use, and characteristics vary, handovers back from 4G to 5G. The frequency of handovers has greatly increased signaling among core network nodes and instances where a user equipment (UE) registers with and authenticates to the network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 is a diagram of a telecommunication network having a core network (e.g., having a combined 4G/5G core network) and 4G and 5G radio access technologies (RATs) available to user equipment (UE) via access networks, the nodes of the core network engaging in signaling and data retention to handle handovers in a manner that optimizes user experience and resource usage.

FIG. 5 depicts an example process at a small message service function (SMSF) for suppressing deregistration messaging to 5G core network nodes and allowing retention by those nodes of information about a UE while the UE is on a 4G RAT.

FIG. 6 depicts an example process at a home subscribe server (HSS) for routing SMS messages in a network that has optimized signaling in accordance with the techniques discussed herein.

DETAILED DESCRIPTION

Figure 2:
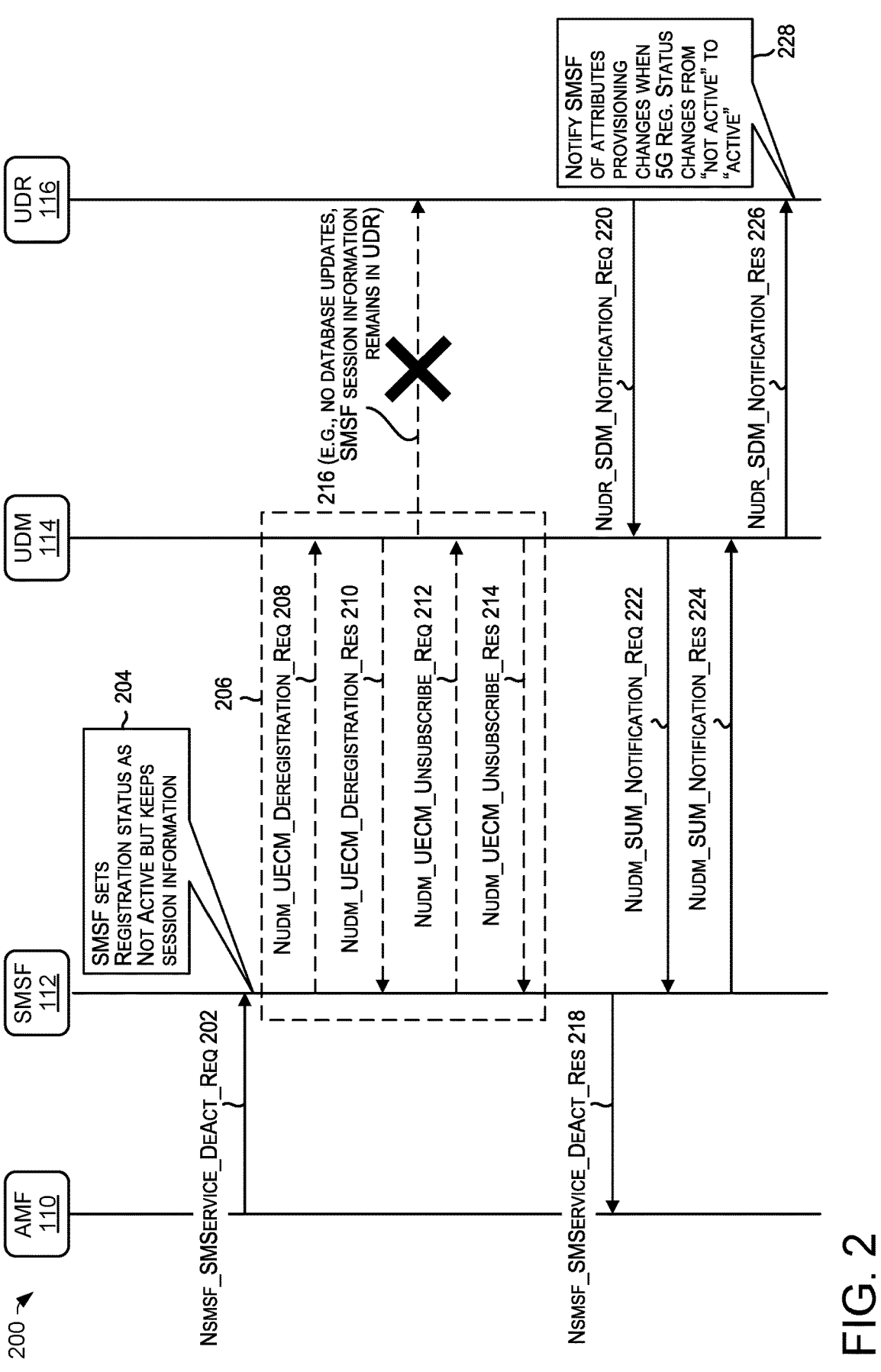
FIG. 2 is a message flow diagram showing a subset of core network nodes and the messages among these nodes and devices to suppress deregistration messaging to 5G core network nodes and allow retention by those nodes of information about a UE while the UE is on a 4G RAT.

Techniques for optimizing messaging by and between components of a fifth generation (5G) network are discussed herein. In particular, this disclosure is directed, in part, to an SMSF and a UDM configured to refrain from sending messages between each other in the context of handovers between 4G and 5G technologies. For example, when a user equipment (UE) attaches to a 5G network, network components can set a 5G registration status to active and a 5G purge flag set to false. During a handover from 5G to 4G, the components can set a 5G registration status to not active, can keep the 5G purge flag set to false, and can refrain from (e.g., suppress) sending deregistration messages and/or unsubscribe messages by and between the SMSF and the UDM. Because deregistration and unsubscribe messages may be suppressed, SMSF session information may be retained, maintained, or otherwise stored at a UDR. When a UE returns to 5G from 4G, the UDR can update network components with any changed data and may refrain from additional updates if the SMSF data has not changed. In this manner, frequent handovers between 5G and 4G (and/or other networks) can reduce messaging by and between network nodes to improve network performance.

Because of message optimization between the SMSF and the UDM that may suppress deregistration and/or unsubscribe messages, SMSF data may remain in storage associated with the UDR when a UE is no longer connected to the 5G network. In some examples, an availability of SMSF information at a UDR for a UE provided an indication to the network that the UE was coupled to (or connected to or otherwise active in) the 5G network, so now that the SMSF data persists during handovers, additional information may be considered when determining whether a UE is connected to a 4G RAT or a 5G RAT, and accordingly, how to route SMS messages to a UE.

Accordingly, additional techniques include receiving, by a home subscriber server (HSS), a query from a short message service center (SMSC) to send a SMS message to a UE. The HSS may send a message to a UDR as a request for UE network status information, and in response, the UDR may return SMSF registration status data and/or access and mobility function (AMF) registration status information. In some examples, the SMSF registration status data and/or the AMF registration status information may be the same as, similar to, or based on the 5G registration status data discussed herein, in that the status information may indicate whether the UE is currently active in the 5G network (which may be independent of whether the UE is registered in the network). Accordingly, the HSS may determine whether the UE is active in the 4G network or the 5G network, and if the UE is active in the 4G network, the HSS may send location data associated with a mobility management entity (MME) to the SMSC, and if the UE is active in the 5G network, the HSS may send location data associated with the SMSF to the SMSC. The SMSC can use the received location data to deliver a SMS message to the particular UE. Accordingly, the techniques facilitate the optimization of messaging by and between the SMSF and the UDM while also ensuring that SMS messages are correctly routed to the UE during handovers between 4G, 5G, and/or other networks.

In some examples, the techniques discussed herein can provide improvements to the functioning of computers in a network and/or can improve network performance. For example, the techniques discussed herein can result in network optimizations to reduce N21 messages, Nudr messages, and/or LDAP messages. In some examples, the techniques discussed herein can reduce signaling by and between the SMSF and the UDM and/or the unified data repository (UDR). In some examples, the techniques discussed herein can improve message signaling during inter-RAT handovers (e.g., between 4G, 5G, and/or other networks). Such reduced messaging can improve network capacity and performance and can improve attach and/or response times during handovers. Additional improvements are discussed throughout this disclosure.

The techniques discussed herein can be implemented in the context of protocols associated with one or more of 3G, 4G, 4G LTE, and/or 5G protocols. In some examples, the network implementations can support standalone architectures, non-standalone architectures, dual connectivity, carrier aggregation, etc. Example implementations are provided below with reference to the following figures.

Figure 1:
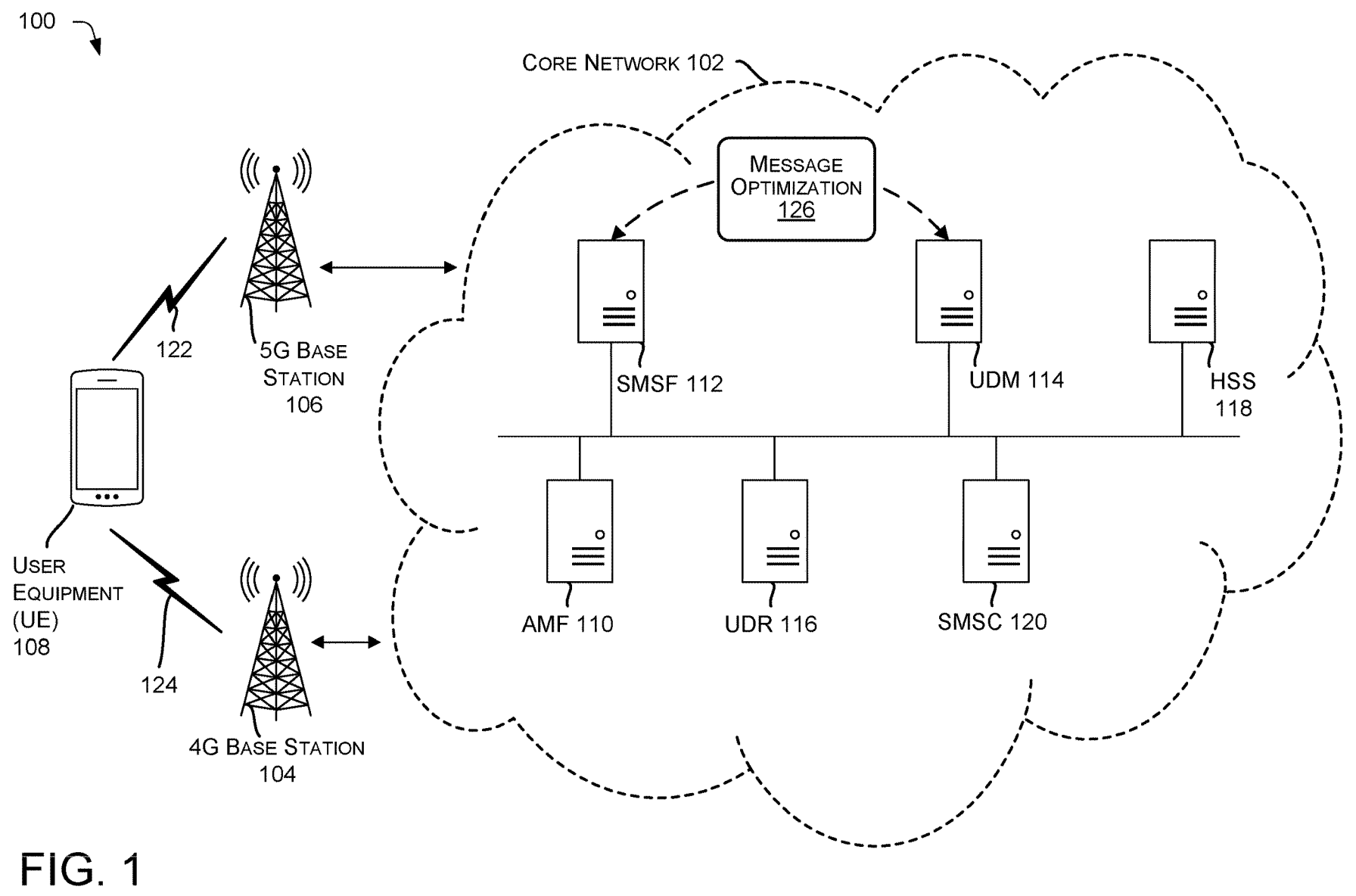

FIG. 1 is a diagram of a telecommunication network 100 having a core network 102 (e.g., having a combined 4G/5G core network) and 4G and 5G radio access technologies (RATs) (base stations 104 and 106, respectively) available to user equipment (UE) 108 via access networks, the nodes of the core network 102 engaging in signaling and data retention to handle handovers in a manner that optimizes user experience and resource usage.

As illustrated, the UE 108 can connect to the 4G base station 104 (e.g., an eNodeB, or an eNB) or to a 5G base station 106 (e.g., a gNodeB, or a gNB) of the telecommunication network 100 and may be directed from one to the other through handover operations. The base stations 104 and 106 can be connected to the core network 102. The core network 102 can include, but is not limited to, an access and mobility management function (AMF) 110, a small message service function (SMSF) 112, a unified data management (UDM) 114, a unified data repository (UDR) 116, a home subscriber server (HSS) 118, and/or small message service center (SMSC) 120. In some examples, the core network 102 can be a core network that supports combined functions of 4G and 5G operations. In some examples, the core network 102 is a 5G core network that is separate from another core network devoted primarily to 4G core network features. Additional details of the core network 102 are discussed throughout this disclosure.

In some examples, the UE 108 can be any device that can wirelessly connect to the telecommunication network. In some examples, the UE 108 can be a mobile phone, such as a smart phone or other cellular phone. In other examples, the UE 108 can be an augmented reality device (e.g., a device (e.g., glasses, a smartphone, a headset, etc.) capable of running augmented reality application(s)), a personal digital assistant (PDA), a media player, a tablet computer, a gaming device, a smart watch, a hotspot, a personal computer (PC) such as a laptop, desktop, or workstation, or any other type of computing or communication device.

In various implementations, 4G and 5G base stations 104 and 106 may be co-located at a same cell site or at different cell sites and may each, offer connectivity to the UE 108 and any other UEs in proximity and capable of connecting to that radio access technology. Based on factors such as the location of the UE 108, the number of UEs utilizing the spectrum of the radio access technology, and the types of services those UEs are using, either of the 4G base station

104 or the 5G base station 106 may offer a better user experience at a different point in time, leading to handovers of the UE 108 between the 4G base station 104 and the 5G base station 106. The rules and thresholds governing the handovers may in some circumstances lead to frequent handovers. These frequent handovers in turn result in an increased signaling burden on the core network 102.

In some implementations, the core network 102 includes nodes and devices from both 4G core networks and 5G core networks. As shown, the core network 102 includes at least AMF 110, SMSF 112, UDM 114, UDR 116, HSS 118, and/or SMSC 120. The core network 102 may also include serving gateways (SGw), packet data network gateways (PGw), session management functions (SMF), user plane function (UPF), policy control function (PCF), or one or more nodes of an Internet protocol multimedia subsystem (IMS), such as a call session control function (CSCF) and its nodes (proxy CSCF (P-CSCF), interrogating CSCF (I-CSCF), and serving CSCF (S-CSCF)) or a policy and charging rule function (PCRF). The different ones among the 4G core network nodes (e.g., a mobility management entity (MME)) and 5G core network nodes may support their respective base stations, corresponding one of the 4G base station 104 or the 5G base station 106 and, to support handovers, may communicate with each other over various interfaces.

In various implementations, the AMF 110, for a given UE, such as UE 108, may receive connection and session related information for the UE, handle connection and mobility management tasks, and forward information for session management to another network node (e.g., a SMSF).

In some examples, the SMSF 112 can include functionality to enable activation and delivery of SMS messages in the core network 102. In some examples, the SMSF 112 can send and receive messages with the UDM 114 and/or the SMSC 120.

In some implementations, the UDM 114 can serve as front-end for user subscription data stored in the UDR 116 to other 5G nodes of the core network 102. The messages through which the UDM 114 requests information and receives it in response from the UDR 116 may conform to a lightweight directory access protocol (LDAP). In some examples, the UDR 116 can serve as the centralized repository of information for the core network 102, storing subscriber profile information, policy data, structured data, application data, etc. In some implementations, in core network 102, the UDR 116 may serve as the centralized repository of information for both 5G nodes (through the UDM 114) and 4G nodes (through HSS 118).

In some examples, the HSS 118 may be the subscriber information database for 4G nodes of core network 102 and either mirrors the UDR 116 or serves as a front end to the UDR 116 for the 4G nodes. In the context of handovers, it may also communicate with the UDM 114 over a proprietary interface or an interface in accordance with standards, such as those of the Third Generation Partnership Project (3GPP).

In some examples, the SMSC 120 can include functionality to handle text message operation. In some examples, the SMSC 120 can receive a message sent to a particular UE, such as the UE 108. The SMSC 120 can respond to a sender that it has accepted the message. In some examples, the SMSC 120 can determine if the recipient is in a same network, and if not, the SMSC 120 can forward the message to the correct network. In some examples, the SMSC 120 can determine if a UE (e.g., the UE 108) is available to received a SMS addressed to the UE. If the UE is not available, the SMSC 120 can store the message and forward it to the recipient when the recipient is online.

In some examples, and without limitation, when a SMS message comes into a network, the SMSC 120 can search (e.g., first) for user registration status in 2G/3G by querying a home location register (HLR) to determine a location of the UE. If the UE is not found, a second attempt may occur to locate the UE via an IMS network. In such as case, the SMSC 120 can query a HSS (e.g., the HSS 118) over a diameter Sh interface to check for an active IMS registration status. If the UE is active, the SMSC 120 can deliver the SMS over a non-access-stratum (NAS) protocol. If the user not found in 2G/3G and a second attempt failed, the SMSC 120 may attempt to locate a UE on a SGd network. The SMSC 120 can check for a 4G or 5G registration status or whether the UE is active (e.g., via the HSS 118) on 4G or 5G. In some examples, the SMSC 120 cannot communicate directly with the UDM 114 (e.g., per 3GPP protocol).

In some examples, the UE 108 can attach to the 4G base station 104 and/or the 5G base station 106. In some examples, when the UE 108 attaches to the 5G base station 106, the UE 108 can register with the core network 102. In some examples, in response to the UE 108 attaching to the network 102, the AMF 110 can register the UE 108 at various nodes of the network, such as at the SMSF 112. The AMF 110 can set an AMF registration status to "active" when the UE 108 is connected to the 5G base station 106. The SMSF 112 can set a SMSF registration status to "active" when the UE 108 is connected to the 5G base station. While the UE 108 is connected to the 5G base station 106, a 5G registration status can be set to "active" and a 5G purge flag (indicating whether to purge session information associated with the UE 108 from the network 102) can be set to "false." When the UE 108 registers with the network 102 when the UE 102 is connected to the 5G base station 106, the SMSF 112 can send messages to the UDM 114 to register and/or to subscribe. However, as discussed herein, when the UE 108 moves from 5G to 4G (e.g., the active connection moves from a connection 122 to a connection 124) the network can include message optimization 126 that can suppress dereg-istration and/or unsubscribe messages by and between the SMSF 112, the UDM 114, and/or other network components and nodes, to optimize performance of the network. Additional details of such messaging and optimizations are shown in FIGS. 2-6 and described further herein with reference to those figures and in other discussions.

FIG. 2 is a message flow diagram 200 showing a subset of core network nodes and the messages among these nodes and devices to suppress deregistration messaging to 5G core network nodes and allow retention by those nodes of infor-mation about a UE while the UE is on a 4G RAT.

By way of example, and without limitation, the diagram 200 illustrates operations of the network after a UE (e.g., the UE 108) is connected to a 5G base station (e.g., the 5G base station 106). In some examples, when the UE is active in the 5G network, the network (e.g., individual functions, such as the AMF 110, the SMSF 112, a session management func-tion (SMF), and the like) can set status indicators (e.g., flags) indicating whether a UE is active in the network. For example, when a UE is active in a 5G network, a 5G registration status flag can be set to "active," and when a UE is not active in the 5G network, the 5G registration status flag can be set to "not active" or "inactive." As noted above, individual functions can track a status of a UE in a network, such that an AMF registration status indicator can indicate whether a UE is active on the AMF (e.g., "active" or "not active"), the SMSF registration status indicator can indicate whether the UE is active on the SMSF, and the like. In some examples, the 5G registration status flag can be considered to be a "parent" flag that depends on the status of individual "child" flags, such as the AMF registration status, the SMSF registration status, and the like. In some examples, some or all of the flags or statuses can be determined, tracked, received by, sent by, and/or stored on any component, function, or device as discussed herein.

In some examples, a first message 202 in FIG. 2 can be sent by the AMF 110 to the SMSF 112 in response to the UE performing a handover (e.g., a handover from the 5G base station 106 to the 4G base station 104). The message 202 represents a Nsmsf_SMService_DeAct_Req 202, which provides an indication from the AMF 110 to the SMSF 112 that the UE is performing a handover from 5G to 4G (e.g., an inter-RAT handover, or an "iRAT"). In some examples, the AMF 110 can maintain or otherwise store (e.g., not remove or delete) SMSF session binding for handovers in a locally accessible database and/or based on a 3GPP unstruc-tured data storage function (UDSF).

In some examples, the network 102 can set the 5G registration status based on the UE being associated with a home network. For example, the techniques can include, in part, setting the 5G registration status based at least in part on a public land mobile network identifier (PLMN ID) of the 5G network indicating that the UE is associated with a home network. In some examples, if a UE is visiting a network (e.g., the UE is roaming with respect to a network), that network may not track the status information as discussed herein.

In response to receiving the message 202, at 204 the SMSF 112 can set a registration status as not active (e.g., the SMSF 112 can set an SMSF registration status as "not active") but the SMSF can keep session information in memory or in an accessible storage location. That is, the techniques can update individual status flags reflecting a status of a UE in the 5G network, can maintain a 5G purge flag as "false" (e.g., to prevent UE information from being deleted or remove), and can set a 5G registration status to "not active."

Next, network message optimization, illustrated by example 206 is discussed herein. By way of background, messages 208, 210, 212, and 214, and associated responses, would be sent in a non-optimized network in response to the message 202. As can be understood, the optimization tech-niques discussed herein suppress the deregistration message 208 and the unsubscribe message 212, thereby preventing the associated responses 210 and 214 from the UDM 114.

At 216, because the UDM 114 does not receive the deregistration message (e.g., the Nudm_UECM_Deregistra-tion_Req 208) or the unsubscribe message (e.g., Nudm_ UECM_Unsubscribe_Req 212), the UDM 114 may not provide any database updates to the UDR 116, and/or the SMSF session information remains in the UDR 116.

In some examples, the UDM 114 may maintain a flag in the UDR 116 regarding handover type and may store the SMSF sessions or any other network function session(s) in the UDR 116.

In some examples, at least partially in response to receiv-ing the message 202, the SMSF 112 can start a timer to track a time since a handover occurred. In some examples, upon expiration of a time or elapsing of a time period, the SMSF 112 can determine that session information associated with a UE is stale and can subsequently deregister and/or unsub-scribe from the UDM 114 for data associated with the UE.

In some examples, the SMSF 112 can maintain a SMSF registration status flag as not active or inactive in response to receiving the message 202 from the AMF 110 indicating that the UE has performed a handover from 5G to 4G. Further, the UE can maintain session information for a configurable time period, as discussed herein.

In some examples, the SMSF 112 can delete stale sessions and then send deregistration messaging (e.g., the message 208) toward the UDM 114 when the session storage exceeds the configurable time period.

In some examples, the SMSF 112 can maintain the UDM registration and subscription information in a local database or based on a 3GPP UDSF solution based on the AMF indication the UE has performed and based on the type of handover (e.g., 5G to 4G, 4G to 5G, or 5G to another RAT).

The SMSF 112 can send a message 218 (e.g., an Nsmsf_SMService_DeAct_Res 218) to the AMF 110 in response to the message 202. In some examples, the message 218 can be an acknowledgement of the message 202.

In some examples, when the UE comes back to 5G (e.g., the UE performs a handover from 4G to 5G, or the UE is otherwise active in the 5G network), the AMF 110 can perform a registration towards the UDM 114 and can use the same SMSF binding with updated timestamps.

In some examples, when the UE returns to the 5G network and the AMF 110 registers the UE again, the SMSF 112 can invoke a new registration with updated timestamp data. In some examples, the UDM 114 (or any other component, function, or device discussed herein) can update the 5G registration status flag to active and the SMSF registration status to "active" to reflect that the UE is active in the 5G network.

In some examples, based on the optimizations discussed herein, the SMSF 112 will not perform any new subscription queries (e.g., a subscriber data management (SDM) subscription queries) in response to receiving a handover notification (e.g., from the AMF 110 or otherwise).

In some examples, the UDM 114 can track changes in data and can notify (e.g., send messages to) the SMSF 112 when the 5G registration status flag changes from "not active" to "active" and the child attribute for SMSF (e.g., the SMSF registration status) is set to "active" or "true." In some examples, such messaging is illustrated by messages 220, 222, 224, and 226, which, as illustrated at 228, shows that the UDR 116 can notify the SMSF 112 of attributes provisioning when the 5G registration status changes from "not active" to "active." In this manner, the SMSF 112 can be provided with the latest data without any additional "get" messages from the SMSF 112 and/or without any additional subscribe messages from the SMSF 112.

Figure 3:
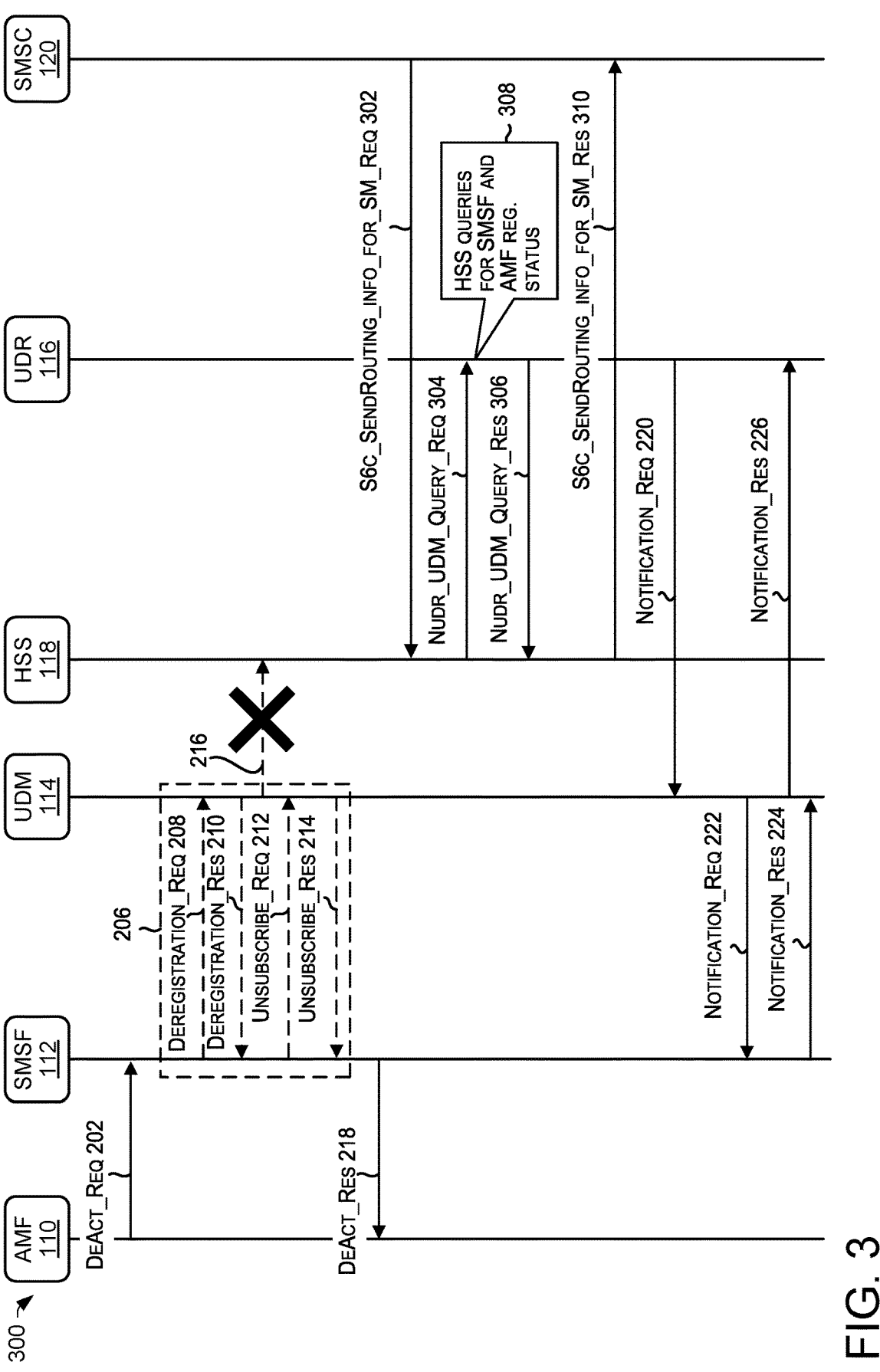
FIG. 3 is a message flow diagram showing a subset of core network nodes and the messages among these nodes and devices to route small message service (SMS) messages in a network that has optimized signaling in accordance with the techniques discussed herein.

FIG. 3 is a message flow diagram 300 showing a subset of core network nodes and the messages among these nodes and devices to route small message service (SMS) messages in a network that has optimized signaling in accordance with the techniques discussed herein.

In some examples, the messages in FIG. 3 occur following the operations illustrated in FIG. 2. That is, the messages in FIG. 3 may occur after a UE 108 has registered with the core network 102 and the core network 102 has implemented the message optimization techniques as discussed herein.

As illustrated in FIG. 3, the same or similar step are labeled with the same numbers as provided in connection with FIG. 2. In sum, a UE registers with the 5G network and individual registration status flags are maintained in individual functions (e.g., the SMSF 112 can maintain a SMSF registration status flag, the AMF 110 can maintain an AMF registration status flag, etc.) and/or the UDM 114 (and/or any network functions, component, or device discussed herein) can maintain a 5G registration status flag and/or a 5G purge flag.

In some examples, when the UE is active in the 5G network, the UE may be associated with active registrations for the AMF 110, the SMSF 112, the SMF, and/or other components. Further, in some examples the active UE may be associated with active subscription data (e.g., session information) stored in the UDR 116. In some examples, during a handover from 5G to 4G, the AMF 110 can send a deregistration message (e.g., the message 202) to the SMSF 112. In response, the SMSF 112 can suppress the deregistration message (e.g., the message 208) and/or the unsubscribe message (e.g., the message 212). As noted above, this can maintain SMSF session information in the network, such as in the UDR 116.

In some examples, the SMSF 112 can extend the life of session information for a configurable period of time (e.g., 1 hour, 2 hours, 24 hours, 48 hours, etc.). That is, the SMSF 112 (and the core network 102) can retain the SMSF session information when the UE is active on the 4G network, where the SMSF session information would otherwise be deleted or removed.

Further, in some examples, a sender may send a SMS to the UE currently in the 4G network. Based on the SMS message to be delivered to the UE, the SMSC 120 can query the HSS 118 via the message 302 (e.g., S6c_SendRouting_info_for_SM_Req 302) over the S6c interface to determine the location of the UE in the network 100.

In response, the HSS 118 can send a query 304 (e.g., Nudr_UDM_Query_Req 304) to the UDR 116 to check if the UE is registered in and/or active in the 5G network. The UDR 116 can respond via a message 306 (e.g., Nudr_UDM_Query_Req 306) to provide the SMSF address information (e.g., because the SMSF session information can be stored in the UDR 116 and the deregistration and/or unsubscribe messages were suppressed, per the optimization 206 discussed above), the SMSF registration status, and/or the AMF registration status information (illustrated as example 308).

In response, and based at least in part on the SMSF registration status and/or the AMF registration status, the HSS 118 can determine whether the UE is active in the 4G network and/or the 5G network. For example, if both the SMSF registration status and the AMF registration status are "active," the HSS 118 can determine that the UE is active in the 5G network. If one or both of the statuses are "not active," the HSS 118 can determine that the UE is not active in the 5G network and is instead active in the 4G network.

If the UE is found active in the 4G network, the HSS 118 can respond via a message 310 (e.g., S6c_SendRouting_info_for_SM_Res 310) indicating an address associated with an MME associated with the UE. In some examples where the UE is active in the 4G network, the message 310 can indicate "MME FQDN/Realm/MT-Number-For-SMS to SMC" in the S6c response.

If the UE is found active in the 5G network, the HSS 118 can response via a message 310 (e.g., S6c_SendRouting_info_for_SM_Res 310) indicating an address associated with a SMSF (e.g., the SMSF 112) associated with the UE. In some examples where the UE is active in the 5G network, the message 310 can indicate "SMSF diameter FQDN/Realm to SMSC" in the S6c response.

In some examples, the SMSC 120 can send a SMS message to the UE based on the address provided in the message 310.

Accordingly, the techniques discussed herein can improve network performance by optimizing messaging between network components or functions without disrupting subsequent operations, such as delivering SMS messages to devices associated with the networks.

Figure 4:
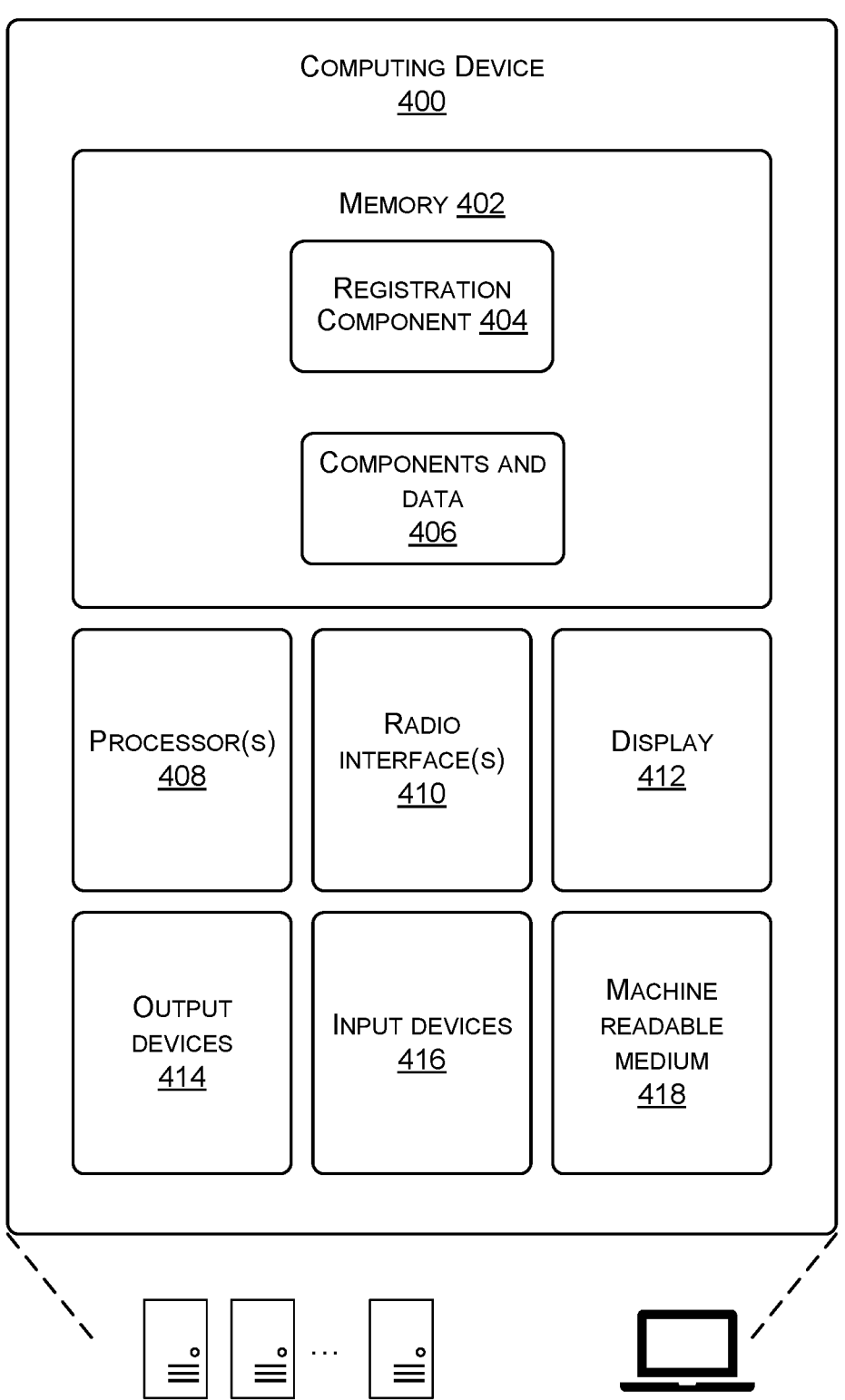
FIG. 4 is a schematic diagram of a computing device capable of implementing functionality of one or more nodes of the core network.

FIG. 4 is a schematic diagram of a computing device 400 capable of implementing functionality of one or more nodes of the core network. In some examples, the computing device 400 can represent the AMF 110, the SMSF 112, the UDM 114, the UDR 116, the HSS 118, the SMSC 120, and/or any other components, functions, or devices discussed herein. As shown, the computing device 400 can have memory 402 storing a registration component 404 and other components and data 406. The computing device 400 can also comprise processor(s) 408, radio interfaces 410, a display 412, output devices 414, input devices 416, and/or a machine readable medium 418.

In various examples, the memory 402 can include system memory, which may be volatile (such as RAM), non-volatile (such as ROM, flash memory, etc.) or some combination of the two. The memory 402 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 400. Any such non-transitory computer-readable media may be part of the computing device 400.

In some examples, the registration component 404 can include functionality to maintain and/or update a registration status indication (e.g., a flag) indicating whether a particular UE is active in the 5G network. For examples, in the context of an SMSF, the registration component 404 can track whether the UE is registered on the SMSF in the 5G network. In the context of an AMF, the registration component 404 can track whether the UE is registered at the AMF in the 5G network. If the status is "active," such a registration status may indicate whether the UE is active in the 5G network (e.g., whether the UE is connected to a 5G base station).

In some examples, the registration component 404 may track a 5G registration status and/or a 5G purge flag, as discussed herein. In some examples, any function, component, or device can track a status of any component in the network. In some examples, the registration component 404 can subscribe to the registration status of other components and/or the registration component 404 can receive subscription requests and can push information to other functions, components, and/or devices upon a change of status or upon any regular or irregular interval. Further, the registration component 404 can respond to any requests for status information.

The other components and data 406 can be utilized by the computing device 400 to perform or enable performing any action taken by the computing device 400. The components and data 406 can include a UE platform, operating system, and applications, and data utilized by the platform, operating system, and applications.

In various examples, the processor(s) 408 can be a central processing unit (CPU), a graphics processing unit (GPU), or both CPU and GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing all computer applications stored in the memory 402, which can be associated with common types of volatile (RAM) and/or nonvolatile (ROM) memory.

The radio interfaces 410 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 410 can be compatible with multiple radio access technologies, such as 5G radio access technologies and 4G/LTE radio access technologies. Accordingly, the radio interfaces 410 can allow the computing device 400 to connect to various components as described herein.

The display 412 can be a liquid crystal display or any other type of display commonly used in computing devices. For example, display 412 may be a touch-sensitive display screen, and can then also act as an input device or keypad, such as for providing a soft-key keyboard, navigation buttons, or any other type of input. The output devices 414 can include any sort of output devices known in the art, such as the display 412, speakers, a vibrating mechanism, and/or a tactile feedback mechanism. Output devices 414 can also include ports for one or more peripheral devices, such as headphones, peripheral speakers, and/or a peripheral display. The input devices 416 can include any sort of input devices known in the art. For example, input devices 416 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 418 can store one or more sets of instructions, such as software or firmware, that embodies any one or more of the methodologies or functions described herein. The instructions can also reside, completely or at least partially, within the memory 402, processor(s) 408, and/or radio interface(s) 410 during execution thereof by the computing device 400. The memory 402 and the processor(s) 408 also can constitute machine readable media 418.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIGS. 2, 3, 5, and 6 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 5 depicts an example process 500 at a small message service function (SMSF) for suppressing deregistration messaging to 5G core network nodes and allowing retention by those nodes of information about a UE while the UE is on a 4G RAT. Some or all of the process 500 may be performed by one or more components as illustrated in FIGS. 1, 2, 3, and 4, as described herein. For example, some or all of process 500 may be performed by the SMSF 112 of FIG. 1.

At operation 502, the process may include receiving, by a SMSF, a registration request from an AMF associated with a UE attaching to a 5G base station. In some examples, the 5G network may register the UE with the network and establish a connection for the UE with the network.

At operation 504, the operation may include setting, by the SMSF and in response to the registration request, 5G registration status to active and a 5G purge flag to false. In some examples, the operation 504 can include setting an individual SMSF registration status to active, as well as or in addition to setting the 5G registration status.

At operation 506, the operation may include receiving, by the SMSF and from the AMF, a handover notification indicating a handover of the UE from 5G to 4G.

At operation 508, the process may include setting, by the SMSF and in response to the handover notification, the 5G registration status to not active and maintaining the 5G purge flag set to false. In some examples, in addition to or instead of setting the 5G registration status, the SMSF may set an SMSF registration status flag to "not active."

At operation 510, the operation may include, based on the 5G registration status and the 5G purge flag, refraining, by the SMSF, from sending a deregistration notification to a UDM. In some examples, the operation 510 can further include refraining from sending an unsubscribe notification to the UDM as well. Accordingly, the network may maintain SMSF session information, which may reduce signaling in the network and may expedite subsequent reattaching of the UE to the network.

FIG. 6 depicts an example process 600 at a home subscribe server (HSS) for routing SMS messages in a network that has optimized signaling in accordance with the techniques discussed herein. Some or all of the process 600 may be performed by one or more components as illustrated in FIGS. 1, 2, 3, and 4, as described herein. For example, some or all of process 600 may be performed by the HSS 118 of FIG. 1.

At operation 602, the process may include receiving, by a HSS, a query from a SMSC to send a SMS to a UE.

At operation 604, the operation may include sending, by the HSS and to a UDM, a request for UE network status information.

At operation 606, the operation may include receiving, by the HSS and from the UDR, SMSF registration status data and AMF registration status data. In some examples, the operation 606 can include receiving SMSF address information as well. As discussed herein, the presence of SMSF information typically indicated that the UE was active in the 5G network, but as can be understood, if the deregistration and/or unsubscribe messages are suppressed according to the techniques discussed herein, the SMSF information may persist despite the UE not being active in the 5G network.

At operation 608, the process may include determining, based on the SMSF registration status data and the AMF registration status data, whether the UE is active in a 4G or a 5G radio network. If the AMF registration status data indicates the UE is "not active," the UE is active in the 4G network and the process continues to operation 610. If the AMF registration status data indicates the UE is "active," the UE is active in the 5G network and the process continues to operation 612.

At operation 610, the operation may include sending, to the SMSC, first location data associated with an MME. In response, the SMSC may route the SMS message to the UE based on the MME information.

At operation 612, the operation may include sending, to the SMSC, second location data associated with the SMSF. In response, the SMSC may route the SMS message to the UE based on the SMSF information.

Example Clauses

A: A method comprising: receiving, by a short message service function (SMSF), a registration request from an access and mobility management function (AMF), the registration request associated with a user equipment (UE) attaching to a fifth generation (5G) base station; setting, by the SMSF and in response to the registration request, 5G registration status to active and a 5G purge flag to false; receiving, by the SMSF and from the AMF, a handover notification as part of a handover of the UE from the 5G base station to a fourth generation (4G) base station; setting, by the SMSF and in response to the handover notification, the 5G registration status to not active and maintaining the 5G purge flag set to false; and based on the 5G registration status and the 5G purge flag, refraining, by the SMSF, from sending a de-registration notification to a unified data management node (UDM) of a 5G network.

B: The method of paragraph A, further comprising: receiving, by the SMSF and from the AMF, a de-registration notification; and refraining, by the SMSF and based on the 5G registration status and the 5G purge flag, from sending the de-registration notification and an unsubscribe message to the UDM.

C: The method of paragraph A or B, further comprising: setting the 5G registration status based at least in part on a public land mobile network identifier (PLMN ID) of the 5G network indicating that the UE is associated with a home network.

D: The method of any of paragraphs A-C, further comprising: starting a timer in response to setting the 5G registration status to not active; determining, based on the timer, that a period of time has elapsed; and in response to determining that the period of time has elapsed, setting the 5G purge flag to true.

E: The method of any of paragraphs A-D, further comprising: sending a state of the 5G registration status to the UDM, wherein the UDM updates a parent 5G registration status based on state indications from the SMSF, the AMF, and a session management function (SMF).

F: The method of any of paragraphs A-E, further comprising: maintaining, by the SMSF, session information associated with the UE in accessible memory based on the 5G purge flag set to false despite the UE being connected to the 4G base station.

G: The method of paragraph F, wherein the handover notification is a first handover notification and the handover is a first handover, the method further comprising: receiving, by the SMSF, a second handover notification as part of a second handover from the 4G base station to the 5G base station; and based on the second handover notification, the 5G registration status, and the 5G purge flag, invoking a new registration of the UE at the 5G network with the session information and updated timestamp data.

H: The method of paragraph G, further comprising: receiving, by the SMSF and from the UDM, a delete notification to delete the session information in response to at least one of: the UE attaching to a new AMF in connection with the second handover notification; or the UE attaching to a new SMSF in connection with the second handover notification.

I: A system comprising: one or more processors; and one or more non-transitory computer-readable media storing computer-executable instructions that, when executed by the one or more processors, cause the system to perform operations comprising: receiving, by a short message service function (SMSF), a registration request from an access and mobility management function (AMF), the registration request associated with a user equipment (UE) attaching to a fifth generation (5G) base station; setting, by the SMSF and in response to the registration request, 5G registration status to active and a 5G purge flag to false; receiving, by the SMSF and from the AMF, a handover notification as part of a handover of the UE from the 5G base station to a fourth generation (4G) base station; setting, by the SMSF and in response to the handover notification, the 5G registration status to not active and maintaining the 5G purge flag set to false; and based on the 5G registration status and the 5G purge flag, refraining, by the SMSF, from sending a de-registration notification to a unified data management node (UDM) of a 5G network.

J: The system of paragraph I, the operations further comprising: receiving, by the SMSF and from the AMF, a de-registration notification; and refraining, by the SMSF and based on the 5G registration status and the 5G purge flag, from sending the de-registration notification and an unsubscribe message to the UDM.

K: The system of paragraph I or J, the operations further comprising: setting the 5G registration status based at least in part on a public land mobile network identifier (PLMN ID) of the 5G network indicating that the UE is associated with a home network.

L: The system of any of paragraphs I-K, the operations further comprising: starting a timer in response to setting the 5G registration status to not active; determining, based on the timer, that a period of time has elapsed; and in response to determining that the period of time has elapsed, setting the 5G purge flag to true.

M: The system of any of paragraphs I-L, the operations further comprising: sending a state of the 5G registration status to the UDM, wherein the UDM updates a parent 5G registration status based on state indications from the SMSF, the AMF, and a session management function (SMF).

N: The system of any of paragraphs I-M, the operations further comprising: maintaining, by the SMSF, session information associated with the UE in accessible memory based on the 5G purge flag set to false despite the UE being connected to the 4G base station.

O: The system of paragraph N, wherein the handover notification is a first handover notification and the handover is a first handover, the operations further comprising: receiving, by the SMSF, a second handover notification as part of a second handover from the 4G base station to the 5G base station; and based on the second handover notification, the 5G registration status, and the 5G purge flag, invoking a new registration of the UE at the 5G network with the session information and updated timestamp data.

P: The system of paragraph O, the operations further comprising: receiving, by the SMSF and from the UDM, a delete notification to delete the session information in response to at least one of: the UE attaching to a new AMF in connection with the second handover notification; or the UE attaching to a new SMSF in connection with the second handover notification.

Q: One or more non-transitory computer-readable media storing computer-executable instructions that, when executed by one or more processors, cause the one or more processors to perform operations comprising: receiving, by a short message service function (SMSF), a registration request from an access and mobility management function (AMF), the registration request associated with a user equipment (UE) attaching to a fifth generation (5G) base station; setting, by the SMSF and in response to the registration request, 5G registration status to active and a 5G purge flag to false; receiving, by the SMSF and from the AMF, a handover notification as part of a handover of the UE from the 5G base station to a fourth generation (4G) base station; setting, by the SMSF and in response to the handover notification, the 5G registration status to not active and maintaining the 5G purge flag set to false; and based on the 5G registration status and the 5G purge flag, refraining, by the SMSF, from sending a de-registration notification to a unified data management node (UDM) of a 5G network.

R: The one or more non-transitory computer-readable media of paragraph Q, the operations further comprising: receiving, by the SMSF and from the AMF, a de-registration notification; and refraining, by the SMSF and based on the 5G registration status and the 5G purge flag, from sending the de-registration notification and an unsubscribe message to the UDM.

S: The one or more non-transitory computer-readable media of paragraph Q or R, the operations further comprising: starting a timer in response to setting the 5G registration status to not active; determining, based on the timer, that a period of time has elapsed; and in response to determining that the period of time has elapsed, setting the 5G purge flag to true.

T: The one or more non-transitory computer-readable media of any of paragraphs Q-S, the operations further comprising: sending a state of the 5G registration status to the UDM, wherein the UDM updates a parent 5G registration status based on state indications from the SMSF, the AMF, and a session management function (SMF).

U: A method comprising: receiving, by a home subscriber server (HSS), a query from a short message service center (SMSC) to send a short message service (SMS) message to a user equipment (UE); sending, by the HSS and to a unified data repository (UDR), a request for UE network status information; receiving, by the HSS and from the UDR, short message service function (SMSF) registration status data and access and mobility function (AMF) registration status data; and determining, based on the SMSF registration status data and the AMF registration status data, whether the UE is active in a fourth generation (4G) radio network or a fifth generation (5G) radio network; and based on the SMSF registration status data and the AMF registration status data, sending, to the SMSC, at least one of: first location data associated with a mobility management entity (MME); or second location data associated with the SMSF.

V: The method of paragraph U, wherein the SMSC causes the SMS message to be sent to the UE based at least in part on the first location data or the second location data.

W: The method of paragraph U or V, further comprising: receiving, in response to the request for UE status information, SMSF location data indicating at the UE is registered in the 5G radio network and the AMF registration status data indicating that the UE is active in the 4G radio network; and based on the AMF registration status data, sending the first location data to the SMSC.

X: The method of any of paragraphs U-W, wherein: the SMSF refrains from sending a deregistration message and an unsubscribe message to a unified data management function node (UDM) in response to receiving, at the SMSF, a deregistration notification from the AMF during a handover by the UE from the 5G radio network to the 4G radio network.

Y: The method of paragraph X, wherein the second location data of the SMSF associated with the UE is maintained at the UDR while the UE is connected to the 4G radio network.

Z: The method of paragraph Y, wherein the second location data of the SMSF associated with the UE is maintained at the UDR for a configurable period of time after the UE performs the handover from the 5G radio network to the 4G radio network.

AA: The method of any of paragraphs U-Z, wherein determining that the UE is registered in the 4G radio network comprises determining that the SMSF registration status data is set to not active and the AMF registration status data is set to not active.

AB: A system comprising: one or more processors; and one or more non-transitory computer-readable media storing computer-executable instructions that, when executed by the one or more processors, cause the system to perform operations comprising: receiving, by a home subscriber server (HSS), a query from a short message service center (SMSC) to send a short message service (SMS) message to a user equipment (UE); sending, by the HSS and to a unified data repository (UDR), a request for UE network status information; receiving, by the HSS and from the UDR, short message service function (SMSF) registration status data and access and mobility function (AMF) registration status data; and determining, based on the SMSF registration status data and the AMF registration status data, whether the UE is active in a fourth generation (4G) radio network or a fifth generation (5G) radio network; and based on the SMSF registration status data and the AMF registration status data, sending, to the SMSC, at least one of: first location data associated with a mobility management entity (MME); or second location data associated with the SMSF.

AC: The system of paragraph AB, wherein the SMSC causes the SMS message to be sent to the UE based at least in part on the first location data or the second location data.

AD: The system of paragraph AB or AC, the operations further comprising: receiving, in response to the request for UE status information, SMSF location data indicating at the UE is registered in the 5G radio network and the AMF registration status data indicating that the UE is active in the 4G radio network; and based on the AMF registration status data, sending the first location data to the SMSC.

AE: The system of any of paragraphs AB-AD, wherein: the SMSF refrains from sending a deregistration message and an unsubscribe message to a unified data management function node (UDM) in response to receiving, at the SMSF, a deregistration notification from the AMF during a handover by the UE from the 5G radio network to the 4G radio network.

AF: The system of paragraph AE, wherein the second location data of the SMSF associated with the UE is maintained at the UDR while the UE is connected to the 4G radio network.

AG: The system of paragraph AF, wherein the second location data of the SMSF associated with the UE is maintained at the UDR for a configurable period of time after the UE performs the handover from the 5G radio network to the 4G radio network.

AH: The system of any of paragraphs AB-AG, wherein determining that the UE is registered in the 4G radio network comprises determining that the SMSF registration status data is set to not active and the AMF registration status data is set to not active.

AI: One or more non-transitory computer-readable media storing instructions executable by one or more processors, wherein the instructions, when executed, cause the one or more processors to perform operations comprising: receiving, by a home subscriber server (HSS), a query from a short message service center (SMSC) to send a short message service (SMS) message to a user equipment (UE); sending, by the HSS and to a unified data repository (UDR), a request for UE network status information; receiving, by the HSS and from the UDR, short message service function (SMSF) registration status data and access and mobility function (AMF) registration status data; and determining, based on the SMSF registration status data and the AMF registration status data, whether the UE is active in a fourth generation (4G) radio network or a fifth generation (5G) radio network; and based on the SMSF registration status data and the AMF registration status data, sending, to the SMSC, at least one of: first location data associated with a mobility management entity (MME); or second location data associated with the SMSF.

AJ: The one or more non-transitory computer-readable media of paragraph AI, wherein the SMSC causes the SMS message to be sent to the UE based at least in part on the first location data or the second location data.

AK: The one or more non-transitory computer-readable media of paragraph AI or AJ, the operations further comprising: receiving, in response to the request for UE status information, SMSF location data indicating at the UE is registered in the 5G radio network and the AMF registration status data indicating that the UE is active in the 4G radio network; and based on the AMF registration status data, sending the first location data to the SMSC.

AL: The one or more non-transitory computer-readable media of any of paragraphs AI-AK, wherein: the SMSF refrains from sending a deregistration message and an unsubscribe message to a unified data management function node (UDM) in response to receiving, at the SMSF, a deregistration notification from the AMF during a handover by the UE from the 5G radio network to the 4G radio network.

AM: The one or more non-transitory computer-readable media of paragraph AL, wherein the second location data of the SMSF associated with the UE is maintained at the UDR while the UE is connected to the 4G radio network.

AN: The one or more non-transitory computer-readable media of paragraph AM, wherein the second location data of the SMSF associated with the UE is maintained at the UDR for a configurable period of time after the UE performs the handover from the 5G radio network to the 4G radio network.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 2, 3, 5, and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, by a short message service function (SMSF), a registration request from an access and mobility management function (AMF), the registration request associated with a user equipment (UE) attaching to a fifth generation (5G) base station;

setting, by the SMSF and in response to the registration request, 5G registration status to active and a 5G purge flag to false;
receiving, by the SMSF and from the AMF, a handover notification as part of a handover of the UE from the 5G base station to a fourth generation (4G) base station;
setting, by the SMSF and in response to the handover notification, the 5G registration status to not active and maintaining the 5G purge flag set to false; and
based on the 5G registration status and the 5G purge flag, refraining, by the SMSF, from sending a de-registration notification to a unified data management node (UDM) of a 5G network.

2. The method of claim 1, further comprising:
receiving, by the SMSF and from the AMF, a de-registration notification; and
refraining, by the SMSF and based on the 5G registration status and the 5G purge flag, from sending the de-registration notification and an unsubscribe message to the UDM.

3. The method of claim 1, further comprising:
setting the 5G registration status based at least in part on a public land mobile network identifier (PLMN ID) of the 5G network indicating that the UE is associated with a home network.

4. The method of claim 1, further comprising:
starting a timer in response to setting the 5G registration status to not active;
determining, based on the timer, that a period of time has elapsed; and
in response to determining that the period of time has elapsed, setting the 5G purge flag to true.

5. The method of claim 1, further comprising:
sending a state of the 5G registration status to the UDM, wherein the UDM updates a parent 5G registration status based on state indications from the SMSF, the AMF, and a session management function (SMF).

6. The method of claim 1, further comprising:
maintaining, by the SMSF, session information associated with the UE in accessible memory based on the 5G purge flag set to false despite the UE being connected to the 4G base station.

7. The method of claim 6, wherein the handover notification is a first handover notification and the handover is a first handover, the method further comprising:
receiving, by the SMSF, a second handover notification as part of a second handover from the 4G base station to the 5G base station; and
based on the second handover notification, the 5G registration status, and the 5G purge flag, invoking a new registration of the UE at the 5G network with the session information and updated timestamp data.

8. The method of claim 7, further comprising:
receiving, by the SMSF and from the UDM, a delete notification to delete the session information in response to at least one of:
the UE attaching to a new AMF in connection with the second handover notification; or
the UE attaching to a new SMSF in connection with the second handover notification.

9. A system comprising:
one or more processors; and
one or more non-transitory computer-readable media storing computer-executable instructions that, when executed by the one or more processors, cause the system to perform operations comprising:

receiving, by a short message service function (SMSF), a registration request from an access and mobility management function (AMF), the registration request associated with a user equipment (UE) attaching to a fifth generation (5G) base station;

setting, by the SMSF and in response to the registration request, 5G registration status to active and a 5G purge flag to false;

receiving, by the SMSF and from the AMF, a handover notification as part of a handover of the UE from the 5G base station to a fourth generation (4G) base station;

setting, by the SMSF and in response to the handover notification, the 5G registration status to not active and maintaining the 5G purge flag set to false; and based on the 5G registration status and the 5G purge flag, refraining, by the SMSF, from sending a de-registration notification to a unified data management node (UDM) of a 5G network.

10. The system of claim 9, the operations further comprising:

receiving, by the SMSF and from the AMF, a de-registration notification; and refraining, by the SMSF and based on the 5G registration status and the 5G purge flag, from sending the de-registration notification and an unsubscribe message to the UDM.

11. The system of claim 9, the operations further comprising:

setting the 5G registration status based at least in part on a public land mobile network identifier (PLMN ID) of the 5G network indicating that the UE is associated with a home network.

12. The system of claim 9, the operations further comprising:

starting a timer in response to setting the 5G registration status to not active;

determining, based on the timer, that a period of time has elapsed; and in response to determining that the period of time has elapsed, setting the 5G purge flag to true.

13. The system of claim 9, the operations further comprising:

sending a state of the 5G registration status to the UDM, wherein the UDM updates a parent 5G registration status based on state indications from the SMSF, the AMF, and a session management function (SMF).

14. The system of claim 9, the operations further comprising:

maintaining, by the SMSF, session information associated with the UE in accessible memory based on the 5G purge flag set to false despite the UE being connected to the 4G base station.

15. The system of claim 14, wherein the handover notification is a first handover notification and the handover is a first handover, the operations further comprising:

receiving, by the SMSF, a second handover notification as part of a second handover from the 4G base station to the 5G base station; and based on the second handover notification, the 5G registration status, and the 5G purge flag, invoking a new registration of the UE at the 5G network with the session information and updated timestamp data.

16. The system of claim 15, the operations further comprising:

receiving, by the SMSF and from the UDM, a delete notification to delete the session information in response to at least one of:

the UE attaching to a new AMF in connection with the second handover notification; or the UE attaching to a new SMSF in connection with the second handover notification.

17. One or more non-transitory computer-readable media storing computer-executable instructions that, when executed by one or more processors, cause the one or more processors to perform operations comprising:

receiving, by a short message service function (SMSF), a registration request from an access and mobility management function (AMF), the registration request associated with a user equipment (UE) attaching to a fifth generation (5G) base station;

setting, by the SMSF and in response to the registration request, 5G registration status to active and a 5G purge flag to false;

receiving, by the SMSF and from the AMF, a handover notification as part of a handover of the UE from the 5G base station to a fourth generation (4G) base station;

setting, by the SMSF and in response to the handover notification, the 5G registration status to not active and maintaining the 5G purge flag set to false; and based on the 5G registration status and the 5G purge flag, refraining, by the SMSF, from sending a de-registration notification to a unified data management node (UDM) of a 5G network.

18. The one or more non-transitory computer-readable media of claim 17, the operations further comprising:

receiving, by the SMSF and from the AMF, a de-registration notification; and refraining, by the SMSF and based on the 5G registration status and the 5G purge flag, from sending the de-registration notification and an unsubscribe message to the UDM.

19. The one or more non-transitory computer-readable media of claim 17, the operations further comprising:

starting a timer in response to setting the 5G registration status to not active;

determining, based on the timer, that a period of time has elapsed; and in response to determining that the period of time has elapsed, setting the 5G purge flag to true.

20. The one or more non-transitory computer-readable media of claim 17, the operations further comprising:

sending a state of the 5G registration status to the UDM, wherein the UDM updates a parent 5G registration status based on state indications from the SMSF, the AMF, and a session management function (SMF).

* * * * *